United States Patent
Sekine et al.

(10) Patent No.: US 6,336,037 B1
(45) Date of Patent: Jan. 1, 2002

(54) PORTABLE RADIO TERMINAL DEVICE

(75) Inventors: Syuuichi Sekine; Noriaki Odachi, both of Yokohama; Toshiki Miyasaka, Urawa, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/264,135

(22) Filed: Mar. 5, 1999

(30) Foreign Application Priority Data

Mar. 19, 1998 (JP) .......................................... 10-070756

(51) Int. Cl.$^7$ ................................................. H04B 1/38
(52) U.S. Cl. ........................ 455/550; 455/575; 455/90; 343/702
(58) Field of Search ................................ 455/550, 553, 455/556, 575, 90, 566, 73, 101, 132–136, 272, 273; 343/702; 379/433

(56) References Cited

U.S. PATENT DOCUMENTS

| | | | |
|---|---|---|---|
| 5,327,584 A | * 7/1994 | Adachi et al. | ................ 455/90 |
| 5,504,813 A | * 4/1996 | Takasaki | ..................... 379/433 |
| 5,918,189 A | * 6/1999 | Kivela | ......................... 455/575 |
| 5,943,021 A | * 8/1999 | Hayes et al. | ................ 343/702 |
| 6,052,567 A | * 4/2000 | Ito et al. | ....................... 455/90 |

* cited by examiner

Primary Examiner—Lester G. Kincaid
(74) Attorney, Agent, or Firm—Foley & Lardner

(57) ABSTRACT

A case with a shape of a thin rectangular parallelepiped which incorporates a radio signal processing circuit is provided with a data input/output section disposed on its surface and a microphone and a speaker disposed on either longitudinal end of the surface. Disposed inside of the case is a linear antenna, which longitudinally extends and goes out of the case from its side, and is placed adjacent to the surface of the case. Thus, the antenna characteristics are protected from deterioration even when the device is used on the desk. Further, the speaker is disposed in one of the sections divided by the longitudinal center line on the case surface and the linear antenna is disposed in the other section. Thus, the antenna gain fluctuation caused by the human body can be prevented so that the stable antenna characteristics can be maintained without being affected by the environment of utilization.

14 Claims, 7 Drawing Sheets

PORTABLE RADIO TERMINAL DEVICE

BACKGROUND OF THE INVENTION

1. Field of the Invention

The present invention relates to a portable radio terminal device provided with both data communication and telephone functions.

2. Related Art Statement

Recently, various portable radio terminal devices are widely spread: portable radio telephones such as cellular phones and car phones, and portable data communication devices utilizing both portable radio telephone and computer devices. To maintain a good radio transmission between a portable radio terminal device and base stations, more and more transmission base stations are constructed and the antenna performance of the portable radio terminal device is maintained and improved.

However, the human body of the portable radio terminal device user has properties to scatter the radio frequency waves. For example, in case of a portable radio telephone device, holding of the portable radio telephone device in hand deteriorates the antenna gain by 5 dB and the contact of the antenna with the human head causes a gain deterioration of 10 dB. For this, in addition to the improvement of the antenna gain itself, the antenna is positioned so that it does not contact with the human head when the speaker of the portable radio telephone device is in contact with the human the human ear. Some portable radio telephone devices are provided with two types of antennas (a bar type antenna and a built-in antenna) and adopt the diversity antenna switching system so that the larger wave input to the antennas can be sent to the portable radio telephone device.

On the other hand, the portable radio telephone device is used for data communication in addition to the telephone application. Portable radio terminal devices incorporating a small computer to achieve both data communication and telephone functions are also becoming popular.

Figure 1A:
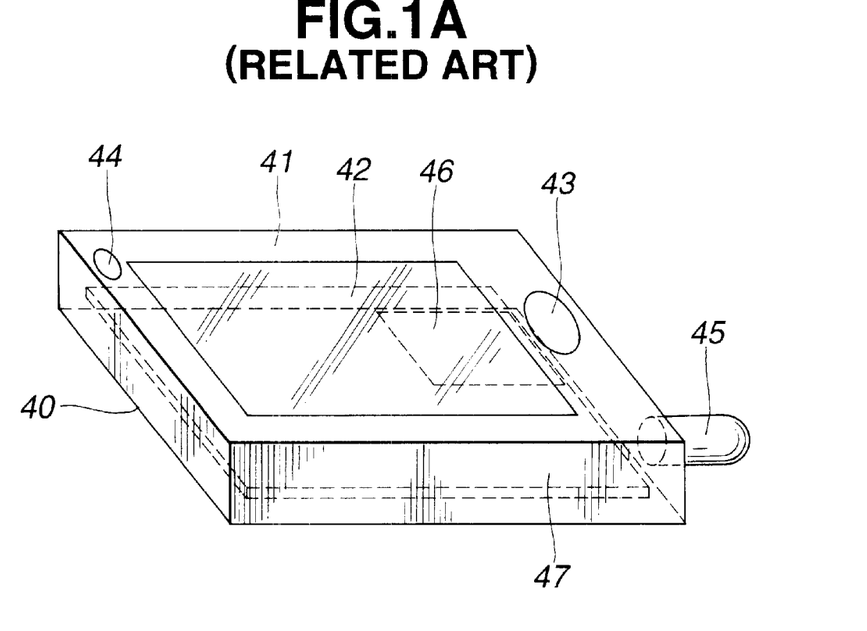
FIG. 1A is a perspective view showing the related art of a portable radio terminal device.
Figure 1B:
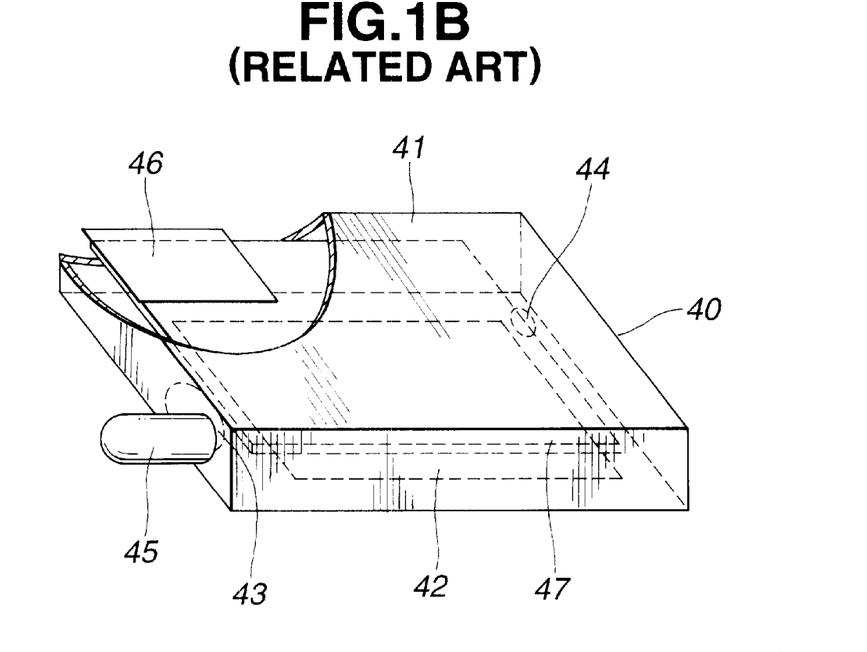
FIG. 1B is a partially cutaway perspective view of FIG. 1A.

FIGS. 1A and 1B show the related art of the portable radio terminal device as described above. FIG. 1A is a front perspective view in which a portable radio terminal device is seen from the front and FIG. 1B is a back perspective view in which a portable radio terminal device with its case partially cut away is seen from the back.

The reference numeral 40 in the figure indicates a portable radio terminal device. The reference numeral 41 indicates a case having a shape of a thin rectangular parallelepiped, 42 indicates a data input/output section consisting of an LCD element and piezoelectric sensors, 43 indicates a speaker, 44 indicates a microphone, 45 indicates a bar antenna which extends and contracts flexibly, 46 indicates a plate type built-in antenna incorporated in the case 41, and 47 indicates a signal data circuit section, in which a circuit for processing radio signals and information data is mounted on a printed wiring board.

The data input/output section 42, the speaker 43, the microphone 44, the bar antenna 45 and the plate antenna 46 are respectively connected to the signal data circuit section 47. When the device is used for telephone service, the voice input from the microphone 44 is processed at the signal data circuit section 47 and then sent by radio transmission to base stations via the bar antenna 45 or the plate antenna 46. At the same time, the signal sent from base stations by radio transmission is received by the bar antenna 45 or plate antenna 46, processed at the signal data circuit section 47 and then output from the speaker 43. When the device is used for data communication, the data input from the data input/output section 42 is processed at the signal data circuit section 47, transmitted from the bar antenna 45 and/or plate antenna 46 to base stations. The device also receives the data transmitted from base stations, processes such data at the signal data circuit section 47 and then outputs or displays the data at the data input/output section 42. Note that the plate antenna 46 is the one most popularly used as the built-in antenna of portable telephones at present.

Figure 2A:
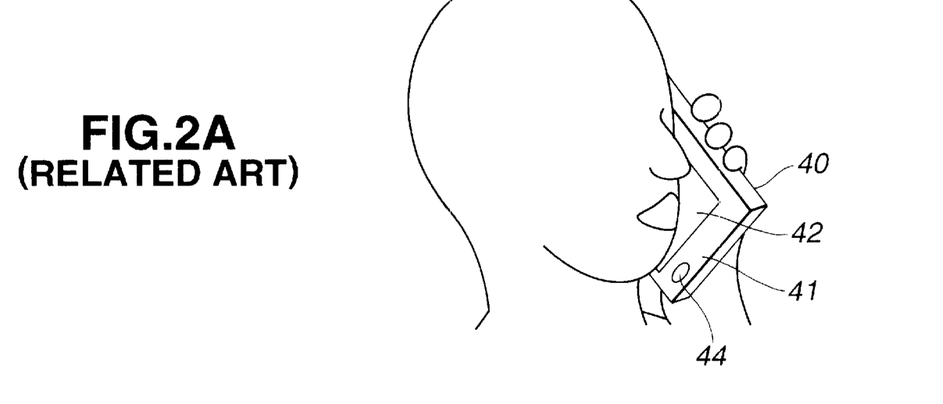
FIGS. 2A to 2C are explanatory views illustrating the utilization statuses of a portable radio terminal device according to the related art.
Figure 2B:
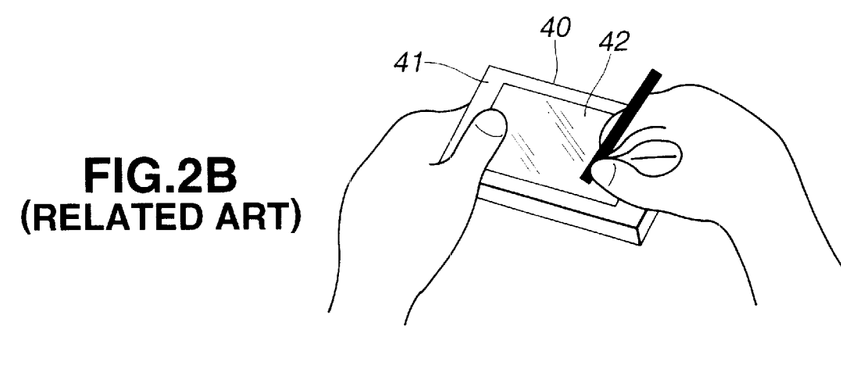
Figure 2C:
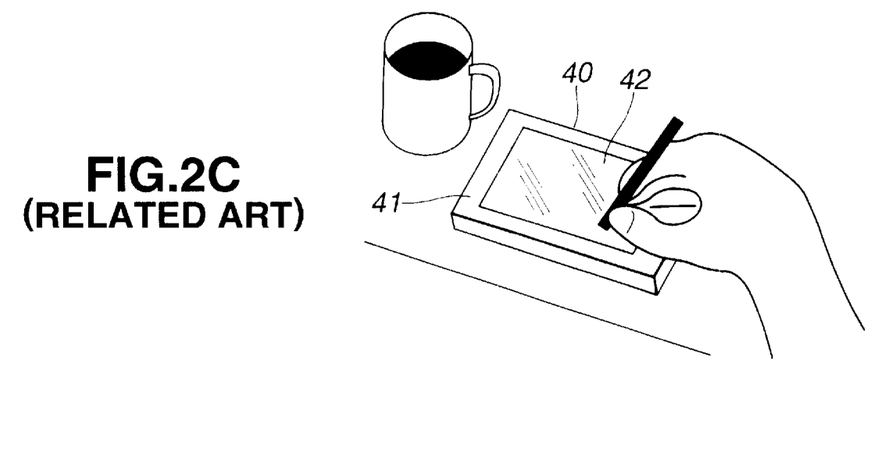

The portable radio terminal device 40 as described above has different spatial relations with the human body depending on its applications (whether it is used for radio telephoning or for data communication). FIGS. 2A to 2C show the utilization status of the portable radio terminal device 40 depending on the application.

FIG. 2A shows the radio telephone application, when the user holds the portable radio terminal device 40 in hand and applies the speaker 43 to the ear for talking over phone. FIG. 2B shows the data communication application, when the user holds an end of the case 41 of the portable radio terminal device 40 by one hand and inputs data or makes data communication operations with the input pointer on the data input/output section 42 by the other hand. FIG. 2C shows another status of the data communication application, when the user places the portable radio terminal device 40 on the desk and inputs data or makes data communication operations with the input pointer on the data input/output section 42 by one hand.

Though it is not shown, the user sometimes uses the portable radio terminal device 40 for data communication by placing it on the lap keeping the status shown in FIG. 2B so that the device is used not on the desk but on the user's lap.

The portable radio terminal device 40 as described above has various utilization styles depending on the user both for radio telephoning and for data communication, and has diversified spatial relations with the human body. The area of contact between the portable radio terminal device 40 and the human body increases or decreases depending on the utilization style, and the influence caused by scattering of the radio frequency input to the bar antenna 45 and the plate antenna 46 also increases or decreases. As a result, even an antenna with optimum properties for a certain utilization style may have the characteristics largely deteriorated in other utilization styles.

Figure 3A:
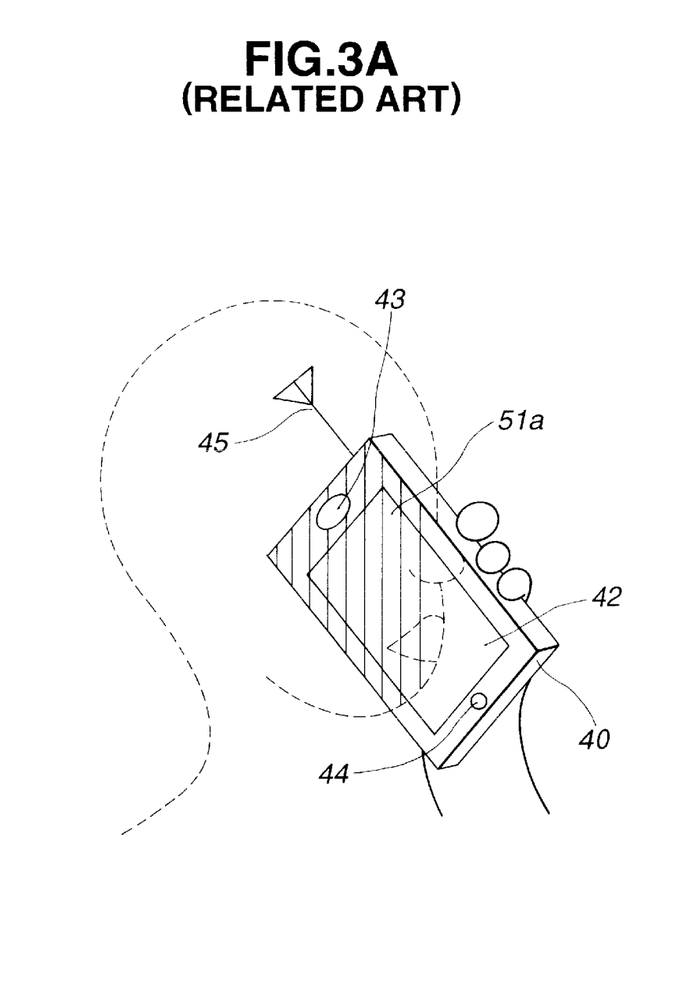
FIGS. 3A and 3B are explanatory views illustrating the contact of a portable radio terminal device with the human body according to the related art.
Figure 3B:
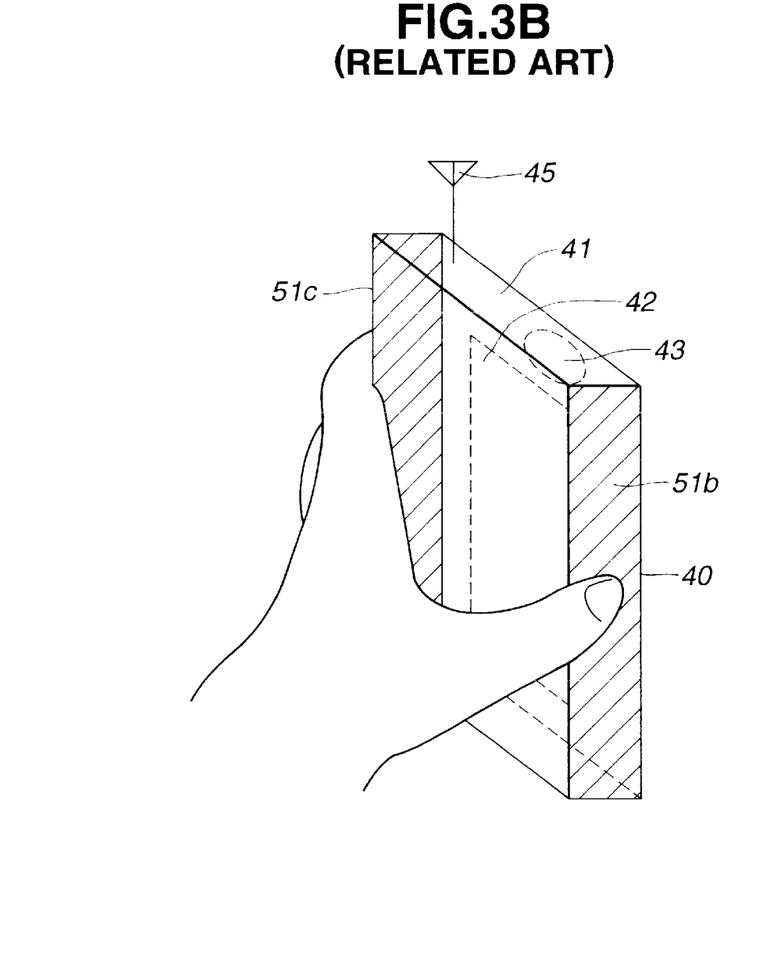

Specifically, FIG. 3A shows the radio telephone application using the portable radio terminal device 40. In this case, the area from the speaker 43 to the section representing substantially a half of the data input/output section 42 on the surface of the portable radio terminal device 40 (shaded area 51a in the figure) is in contact with or is positioned very closely to the human head. In addition, as shown in FIG. 3B, the user holds the portable radio terminal device 40 from the back in either the right or left hand by gripping both its sides in order to position the device 40 near the human head. As a result, at least both sides of the portable radio terminal device 40 (shaded areas 51b and 51c in the figure) are in contact with the human body. Further, when the user holds the portable radio terminal device 40 tightly in hand, the palm comes into contact with the back of the device 40.

Figure 4A:
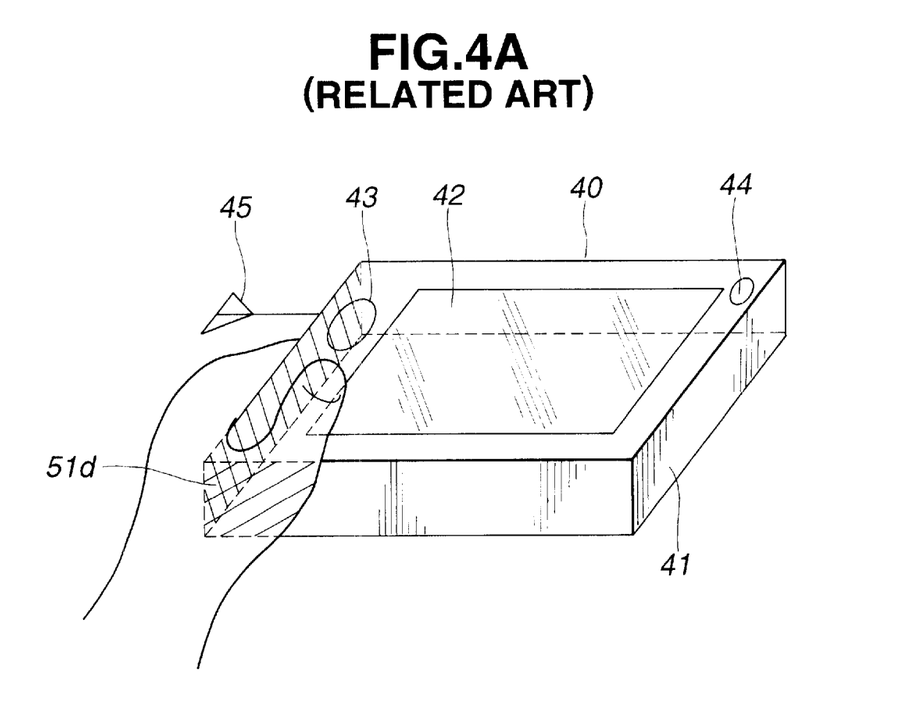
FIGS. 4A and 4B are explanatory views illustrating the contact of a portable radio terminal device with the human body or other materials according to the related art.

On the other hand, in the data communication application using a portable radio terminal device 40, supposing that the user is right-handed, the user generally grasps the head of the portable radio terminal device 40 with the bar antenna 45 and the speaker 43 by the left hand as shown in FIG. 4A and inputs data or makes data communication operations with the right hand using the data input pointer. In this case, the vertical face (shaded area 51d in the figure) of the portable radio terminal device 40 held by the left hand is in contact with the hand. In particular, when the bar antenna 45 of the portable radio terminal device 40 is entirely or partially covered with the left hand, the antenna characteristics are largely deteriorated by the left hand.

Figure 4B:
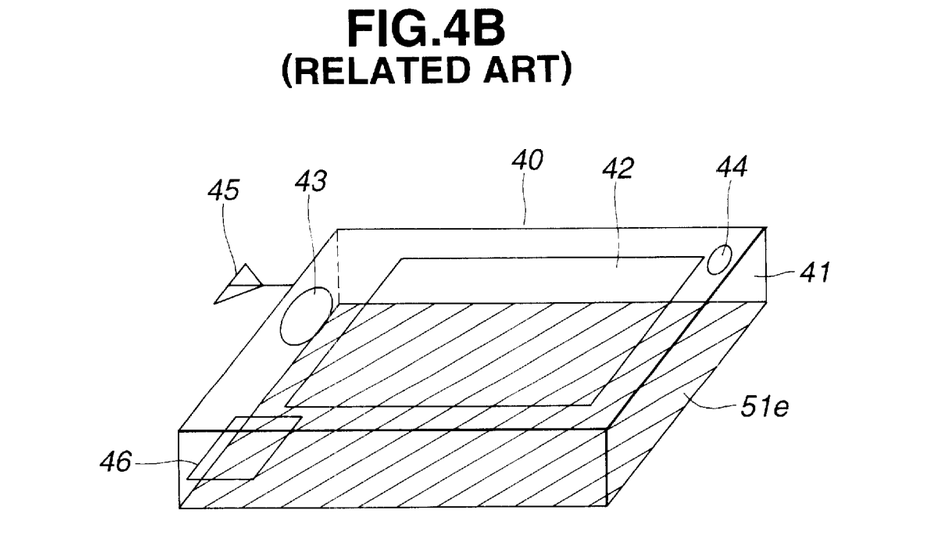

Besides, when the back of the portable radio terminal device 40 (the opposite side of the surface where the data input/output section 42, the speaker 43 and the microphone 44 are positioned) is placed directly on the desk, the portable radio terminal device 40 is closely in contact with the desk on its back (shaded area 51e in FIG. 4B). Many desks are recently made of metal with painted surfaces. If the top plate of the desk is metal, the desktop plate serves as a reflection plate of the radio wave and prevents the radio wave from sufficiently reaching the bar antenna 45 and the plate antenna 46 of the portable radio terminal device 40. In particular, this phenomenon may cause deterioration of the antenna gain at the plate antenna 46 in this case.

Considering the telephone function alone as the application of the portable radio terminal device 40, it is possible to minimize the antenna characteristics deterioration caused by the human body by arranging the bar antenna 45 and the plate antenna 46 of the portable radio terminal device 40 at positions so that they do not come into contact with or come close to the human body or the head in particular when the user holds the portable radio terminal device 40 in either the right or left hand for radio telephoning. However, with the addition of the data communication function to the applications of the portable radio terminal device 40 and diversification of utilization styles when the device is used for data communication, the antenna characteristics are susceptible to deterioration.

The portable radio terminal device having the radio telephone function and the data communication function is used in different ways depending on its application (whether it is used for radio telephoning or data communication). Due to the difference in the contact area between the human body and the portable radio terminal device, the antenna characteristics deterioration conditions under the influence of the human body to the radio frequency are diversified. Further, there are many ways of utilization for data communication using the portable radio terminal device. Corresponding to where the portable radio terminal device other than contact with the human body, the antenna characteristics deteriorate differently and the antenna characteristics vary depending on how the portable radio terminal device is used.

OBJECT AND SUMMARY OF THE INVENTION

An object of the present invention is to provide a portable radio terminal device which can maintain stable antenna characteristics for both radio telephone application and data communication application.

Another object of the present invention is to provide a portable radio terminal device which can maintain stable antenna characteristics without being affected by the environment when the device is used for data communication.

A portable radio terminal device according to the present invention comprises a case having a shape of a thin rectangular parallelepiped and incorporating a radio transmission circuit, a data input/output means disposed on the surface of the case and connected to the radio transmission circuit, a microphone disposed at a longitudinal end of the surface, a speaker positioned at the other longitudinal end of the surface and in one of the longitudinal sections divided at the center of the latitudinal direction on the surface, and a linear antenna installed in the other longitudinal section divided at the center of the latitudinal direction on the surface which extends in the longitudinal direction of the case from inside of the case to outside via a side of the case adjacent to the end of the surface where the speaker is positioned.

A portable radio terminal device according to the present invention alternatively comprises a case having a shape of a thin rectangular parallelepiped and incorporating a radio transmission circuit, a data input/output section disposed on the surface of the case and connected to the radio transmission circuit, a microphone disposed at a longitudinal end of the surface, a speaker positioned at the other longitudinal end of the surface and in one of the longitudinal sections divided at the center of the latitudinal direction on the surface, a linear antenna installed in the other longitudinal section divided at the center of the latitudinal direction on the surface which extends in the longitudinal direction of the case from inside of the case to outside via a side of the case adjacent to the end of the surface where the speaker is positioned, and a built-in antenna disposed near the back in the case and connected to the radio transmission circuit.

A portable radio terminal device according to the present invention comprises a case having a shape of a thin rectangular parallelepiped and incorporating a radio transmission circuit, a data input/output means disposed on the surface of the case and connected to the radio transmission circuit, a microphone means disposed at a longitudinal end of the surface, a speaker means positioned at the other longitudinal end of the surface and in one of the longitudinal sections divided at the center of the latitudinal direction on the surface, and a linear antenna installed in the other longitudinal section divided at the center of the latitudinal direction on the surface which extends in the longitudinal direction of the case from inside of the case to outside via a side of the case adjacent to the end of the surface where the speaker means is positioned.

Other characteristics and profits of the present invention will be sufficiently clarified in the description below.

DETAILED DESCRIPTION OF THE PREFERRED EMBODIMENTS

Referring to the attached figures, preferred embodiments of the present invention will be described in details below.

Figure 5:
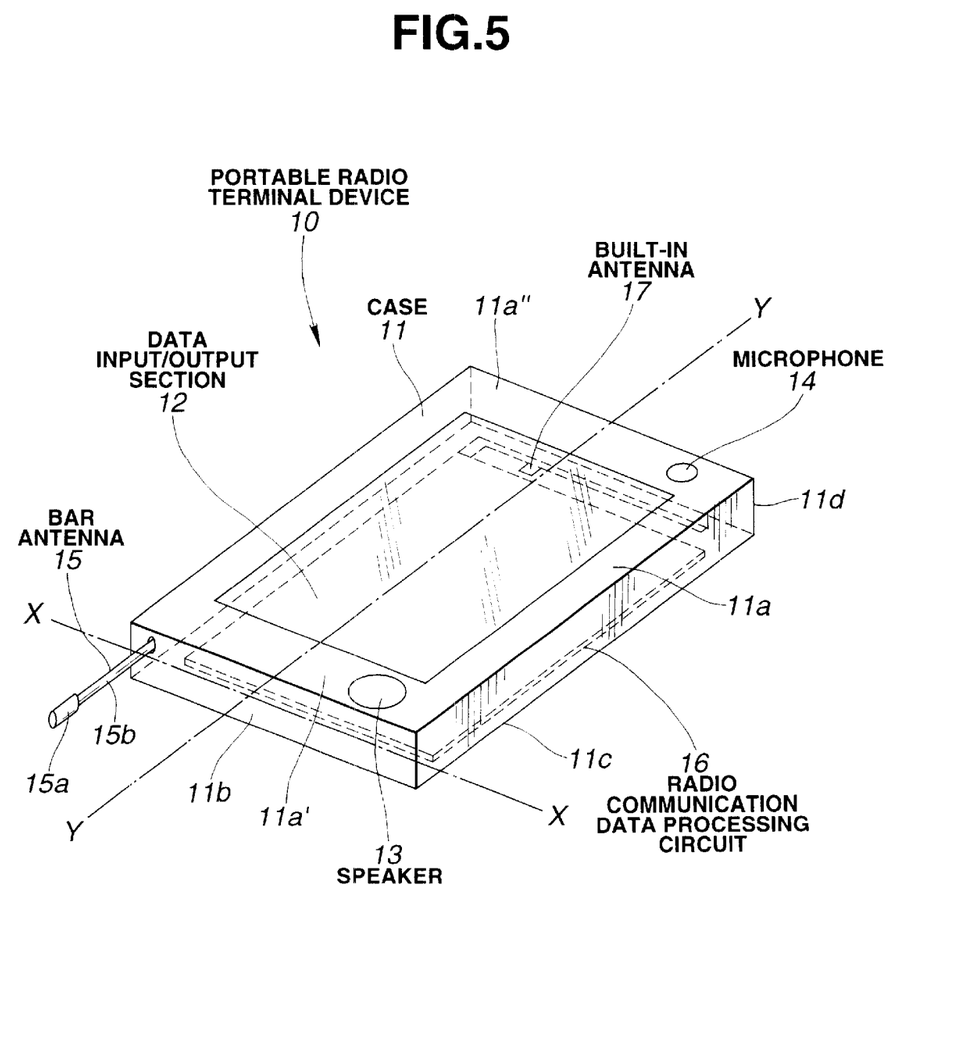
FIG. 5 is a perspective view illustrating a portable radio terminal device according to the present invention.

FIG. 5 is a perspective view to show an embodiment of a portable radio terminal device according to the present invention.

A portable radio terminal device 10 according to the present invention is provided with a case 11, which is a thin rectangular parallelepiped. Positioned on a surface 11a of the case 11 is a rectangular-shaped data input/output section 12. The data input/output section 12 consists of a liquid crystal display element with a piezoelectric sensor positioned on its surface. On the surface 11a where the data input/output section 12 is disposed, a speaker 13 is placed at an end 11a' and a microphone 14 is positioned at the other end 11a" of the outer periphery in the longitudinal direction. The speaker 13 and the microphone 14 are both in one of the sections of the surface 11a, which is divided by the longitudinal center line Y—Y and they are oppositely positioned on both sides of the data input/output section 12.

A bar antenna 15 is disposed in the other section divided by the center line Y—Y and on the vertical surface 11b, which is in contact with the end 11a' where the speaker 13 is positioned. The bar antenna 15 comprises an antenna head 15a and an extension section 15b. When the extension force or the contraction force is applied to the antenna head 15a, the extension section 15b is extended from the case 11 or contracted for storage.

Further, the bar antenna 15 is placed at a position which is as closest as possible to the surface 11a of the case 11 over the center line X—X of the height on the vertical surface 11b of the case 11, or at the furthest position from the bottom 11c of the case 11. That is, the bar antenna 15 is placed on the vertical surface 11b at a position far from the bottom 11c and close to the surface 11a so that it extends and contracts in parallel with the surface 11a.

Inside of the case 11 is a radio communication data processing circuit 16. To the radio communication data processing circuit 16, the data input/output section 12, the speaker 13, the microphone 14 and the bar antenna 15 are electrically connected. The radio communication data processing circuit 16 comprises a data processing circuit (not shown) for sending/receiving or input/output of various data with the data input/output section 12 and an electronic circuit (not shown) which converts the sound from the microphone 14 into the radio frequency, converts the radio frequency to the sound so that it can be output from the speaker 13 and at the same time serves for radio telephoning and data communication via the bar antenna 15.

The data input/output section 12 provides data display in the form corresponding to the operation mode indicated on the liquid crystal display element. By pressing the piezoelectric sensor disposed on the surface of the liquid crystal display device, the user can input alphanumeric characters and specify and cancel various operation modes.

The antenna gain deterioration when the portable radio terminal device 10 with the above structure and configuration is placed on the desk is analyzed. As a result of measurement using the mismatching loss determined from the ratio of the power supplied to the antenna and the power actually input to the antenna, it is clearly proved that the portable radio terminal device 10 has a largely improved mismatching loss when compared with the portable radio terminal device 40 shown as the related art in FIGS. 1A and 1B.

FIGS. 6A, 6B and 7 to 10 show the measurement method and the measurement results of the mismatching loss.

Figure 6A:
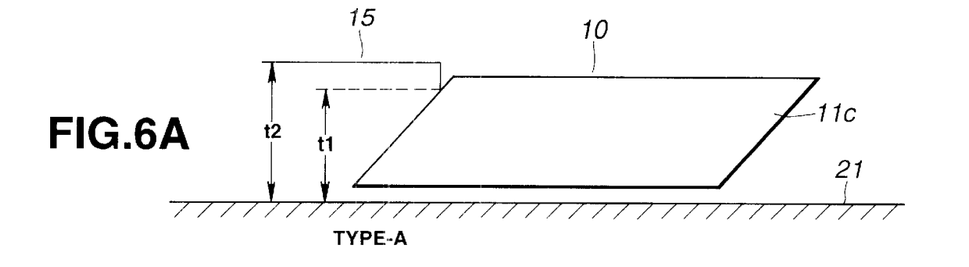
FIGS. 6A and 6B are explanatory views illustrating the statuses for antenna gain measurement.
Figure 6B:
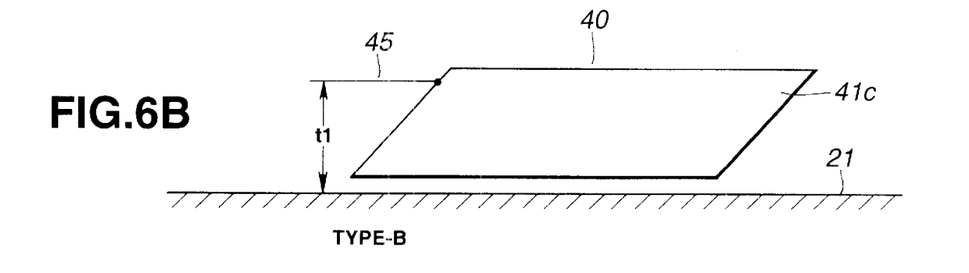

FIGS. 6A and 6B show models for measuring the antenna mismatching loss when the portable radio terminal device is placed on the desk for utilization. FIG. 6A is an example of measurement for the portable radio terminal device 10. In this example, the bottom 11c of the case 11 is placed on a metal plate 21, which is supposed to be the desktop surface, and the bar antenna 15 is positioned at a distance t2 from the metal plate 21 (Type A). FIG. 6B shows an example of measurement for the portable radio terminal device 40, which is described as the related art. In this example, the bottom 41c of the case 41 is placed on the metal plate 21 and the bar antenna 45 is positioned at the same height as the bottom 41c and at a distance t1 from the metal plate 21 (Type B).

In short, FIGS. 6A and 6B show examples where the mounting position of the bar antenna 15 is changed between the distance t1 and t2 from the metal plate 21 so that the change in the mismatching loss is determined.

Figure 7:
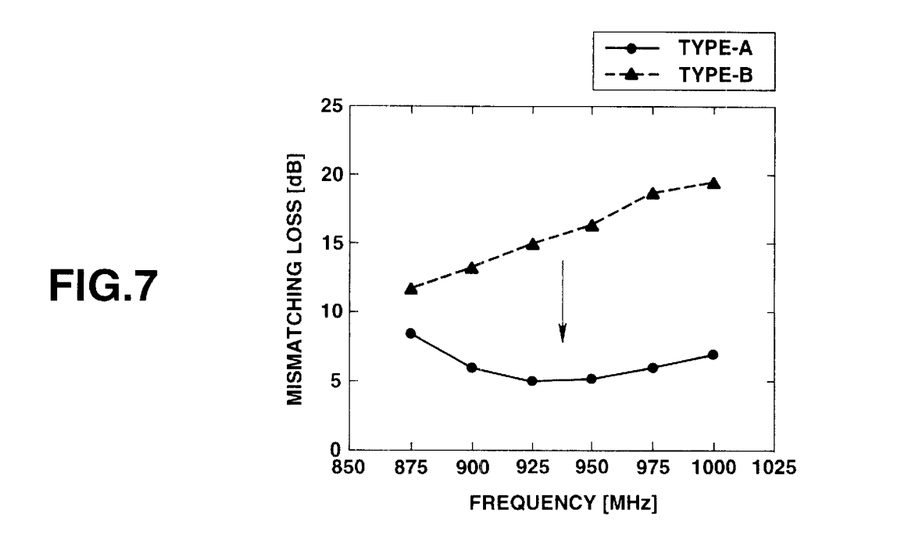
FIG. 7 is a graph showing the comparison of the antenna gain measurement results.

FIG. 7 is a graph to show the measurement results of the antenna mismatching loss by indicating the frequency on the horizontal axis and the mismatching loss for the vertical axis. In the figure, the solid line represents the type A and the broken line represents the type B. As shown in FIG. 7, for the frequency from 875 to 1000 MHz, which is the radio frequency used in this type of portable radio terminal devices 10 and 40, the type B model with the bar antenna position according to the related art has a high mismatching loss from about 12 to 20 dB. In case of the type A model according to the present embodiment, the mismatching loss is largely improved and ranges from 5 to 8 dB.

When the bar antenna 15 is just placed near the surface 11a, the antenna mismatching loss problem will be caused by contact of the bar antenna 15 with the head when the user holds the case 11 in hand.

In this embodiment, the bar antenna 15 and the speaker 13 are positioned in two different areas separated by the line Y—Y in FIG. 5 so that the antenna mismatching loss can be reduced.

Figure 8:
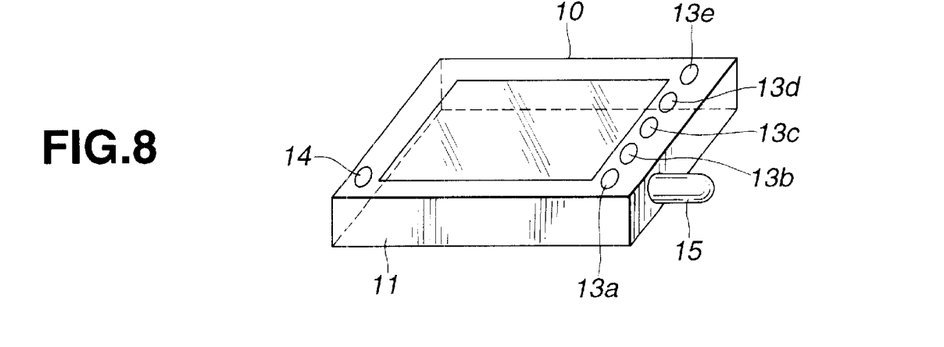
FIG. 8 is a perspective view showing the positional relation between the bar antenna and the speaker.
Figure 9:
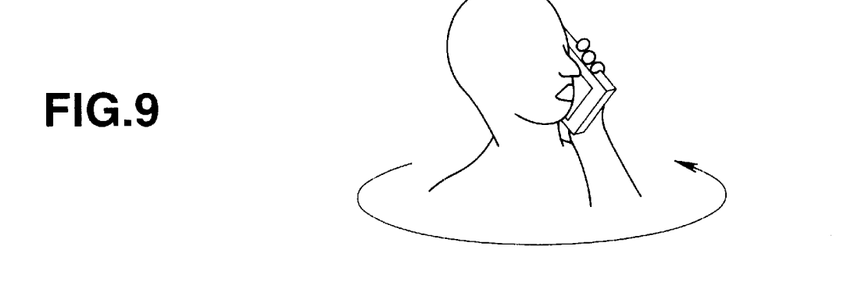
FIG. 9 is an explanatory view showing the antenna gain measurement status.
Figure 10:
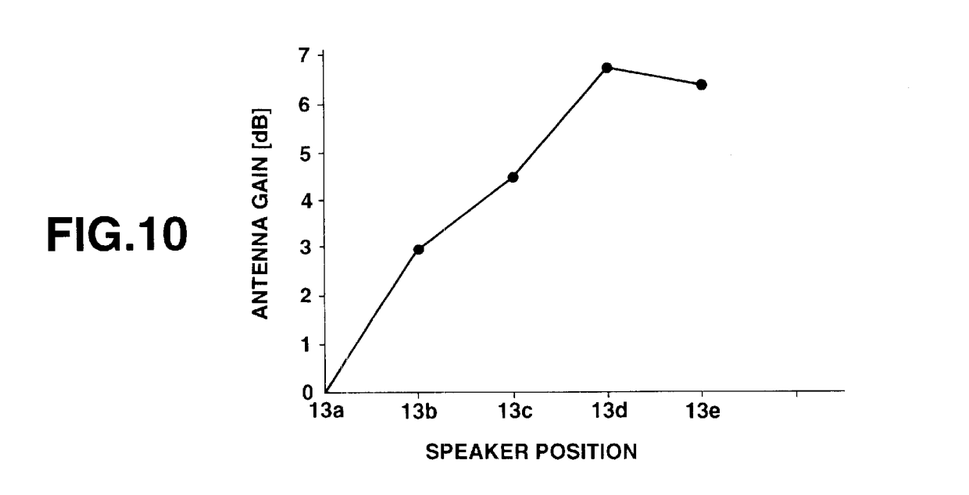
FIG. 10 is a graph showing the measurement results of the antenna gain.

Referring now to FIGS. 8 to 10, the relation between the antenna mismatching loss and the position of the antenna 15 and the speaker 13 will be described below. FIG. 8 shows an example where the bar antenna 15 is fixed at an end of the vertical surface 11b of the case 11 and the position of the speaker 13 is changed from the position 13a closest to the bar antenna 15 to the position 13e by five steps with the equivalent intervals. FIG. 9 shows the status when the user rotates for 360 degrees on a horizontal plane by maintaining the portable radio terminal device 10 in the telephone call status.

For the positions of the speaker 13 as shown in FIG. 8, the average antenna gain for the vertical polarization in case the user makes a rotation on a horizontal plane as shown in FIG. 9 is determined. FIG. 10 is a graph showing the results of such determination by indicating the speaker position on the horizontal axis and the antenna gain on the vertical axis.

As shown in FIG. 10, only a low antenna gain can be obtained at positions 13a and 13b, where the speaker 13 is close to the bar antenna 15. The antenna gain is remarkably improved for the positions 13c to 13e, where the speaker 13 is distanced from the bar antenna 15 over the longitudinal center line on the surface of the case.

Specifically, it is proved that the influence of absorption and reflection caused between the human body and the radio frequency can be reduced by oppositely positioning the speaker 13 and the bar antenna 15 on substantially the same level on either side of the longitudinal center line of the portable radio terminal device 10 and by providing a distance between the speaker 13 and the bar antenna 15.

For a portable radio terminal device 10 having such configuration, the speaker 13 and the microphone 14 are oppositely positioned in a section divided by the longitudinal center line Y—Y of the portable radio terminal device 10 and the bar antenna 15 is positioned in the other section across the center line Y—Y and the speaker 13 and the bar antenna 15 are distanced. Thus, the decline of the antenna gain due to contact with the human body or scatter of the radio frequency caused by the human body during radio telephony using the portable radio terminal device 10 can be minimized. Considering now that a part of the portable radio terminal device 10 is covered with the hand during its use for data communication, the portable radio terminal device can be designed so that the user holds either the speaker 13 or the microphone 14 on the surface of the case 11. Direct contact of the bar antenna 15 with the human body can be thus avoided. Further, when the portable radio terminal device 10 is directly placed on the desk, the influence of the desktop surface to the radio frequency can be frequency can be reduced by disposition of the bar antenna 15 at a position close to the surface 11a of the case 11 over the center line X—X of the vertical surface 11b of the case 11. It becomes possible to send and receive stable radio frequencies in any utilization status of the portable radio terminal device 10.

Though the user holds the portable radio terminal device 10 by the left hand in the above example of utilization status for radio telephoning using the portable radio terminal device 10, this status is not limited to holding by the left hand with the speaker 13 of the portable radio terminal device 10 applied to the left ear for radio telephoning. The portable radio terminal device 10 may be held with the right hand with its speaker 13 applied to the right ear for radio telephoning. When the device is held with the right hand, however, the bar antenna 15 comes close to the human neck and the improvement of the antenna gain as explained in FIGS. 8 to 10 cannot be achieved.

In order to obtain a sufficient antenna gain regardless of the hand holding the portable radio terminal device 10, a built-in antenna 17 is added to the portable radio terminal device 10. The diversity reception system is adopted so that, between the bar antenna 15 and the built-in antenna 17, the antenna with the larger input power is made effective. The built-in antenna 17 is, as shown in FIG. 5, additionally disposed at an end of the printed wiring board for the radio communication data processing circuit 16 in the case 11 so that it is positioned close to the vertical surface 11d, which is opposite to the vertical surface 11b of the case 11 with the bar antenna 15 and in contact with the surface 11a of the case 11 where the microphone 14 is disposed.

The built-in antenna 17 is of the inverted F type. It is a flat thin film antenna which forms a shape of F in the conductor network on the printed wiring board. The built-in antenna 17 is connected to the diversity reception circuit in the radio communication data processing circuit 16 disposed inside of the case 11 and is positioned so that at least its power feed section is placed on the same side as the bar antenna 15 when seen from the longitudinal center line Y—Y of the case 11.

By additionally disposing the built-in antenna 17 having such configuration on the portable radio terminal device 10, no matter the user holds the portable radio terminal device 10 with the right hand or the left hand for radio telephone application, the device is automatically switched to the antenna with the larger input power between the bar antenna 15 and the built-in antenna 17 corresponding to the radio frequency reception status. Thus, the device can always receive the signal with a stable antenna gain.

When the user holds the portable radio terminal device 10 variously and, touches the bar antenna 15, for example, the device can send and receive the signal via the built-in antenna 17. When the section with the built-in antenna 17 in the case 11 is covered with the hand, the bar antenna 15 works for signal transmission. When the portable radio terminal device 10 is placed on the desk, the built-in antenna 17 has a lower antenna gain under the influence of the desktop, but the bar antenna 15 can be used for transmission.

According to this embodiment, by positioning the speaker and the microphone oppositely at both longitudinal ends of a half section divided by the longitudinal center line on the surface of the case and by disposing the bar antenna in the other half section divided by the center line so that it is on the vertical surface of the case close to the speaker and is close to the case surface, the antenna gain deterioration due to absorption and dispersion of the radio frequency caused by the human body during radio telephone application can be minimized. At the same time, the area in contact with the human body during the data communication can be reduced and the decline of the antenna gain by materials other than the human body (metal material, for example) can be minimized.

For the built-in antenna incorporated in the portable radio terminal device, an inverted F type antenna is adopted because it has an advantage that the space for antenna forming can be made small. It is obvious that the same effect can be achieved by a conventional helical built-in antenna.

It is obviously understood that various different embodiments in a wide range can be achieved according to the present invention without departing from the spirit and scope of the invention. The present invention is only limited by the appended claims and is not limited by its particular embodiments.

What is claimed is:

1. A portable radio device, comprising:
   a case having a shape of a thin rectangular parallelpiped and incorporating a radio transmission circuit,
   a data input/output section on the surface of said case and connected to said radio transmission circuit,
   a microphone disposed at a longitudinal end of said surface,
   a speaker disposed at the other longitudinal end of said surface positioned in one of the longitudinal sections divided at the center of the latitudinal direction of said surface, and
   a linear antenna installed at the other longitudinal section divided at the center of the latitudinal direction on said surface which extends in the longitudinal direction of said case from inside of said case to outside via a side of said case adjacent to the end of the surface where said speaker is positioned,
   wherein both said speaker and said microphone are positioned in the one of the longitudinal sections divided at the center of the latitudinal direction of said surface.

2. A portable radio terminal device according to claim 1, wherein said linear antenna is disposed close to said surface in said case.

3. A portable radio terminal device according to claim 1, wherein said linear antenna is disposed close to the side at an end of said latitudinal direction in said other section inside of said case.

4. A portable radio terminal device according to claim 1, further comprising:
   a built-in antenna disposed near the back in said case and connected to said radio transmission circuit.

5. A portable radio terminal device according to claim 4, wherein said linear antenna is disposed close to said surface in said case.

6. A portable radio terminal device according to claim 4, wherein said linear antenna is disposed close to the side at an end of said latitudinal direction in said other section inside of said case.

7. A portable radio terminal device according to claim 4, wherein said built-in antenna is of either helical type or inverted F type.

8. A portable radio terminal device, comprising:
   a case having a shape of a thin rectangular parallepiped and incorporating a radio transmission circuit,
   a data input/output means disposed on the surface of said case and connected to said radio transmission circuit,
   a microphone means disposed at a longitudinal end of said surface,
   a speaker means disposed at the other longitudinal end of said surface positioned in one of the longitudinal sections divided at the center of the latitudinal direction of said surface, and
   a linear antenna installed in the other longitudinal section divided at the center of the latitudinal direction on said surface which extends in the longitudinal direction of said case from inside of said case to outside via a side of said case adjacent to the end of the surface where said speaker means is positioned,
   wherein both said speaker means and said microphone means are positioned in the one of the longitudinal sections divided at the center of the latitudinal direction of said surface.

9. A portable radio terminal device according to claim 8, wherein said linear antenna is disposed close to said surface in said case.

10. A portable radio terminal device according to claim 8, wherein said linear antenna is disposed close to the side at an end of said latitudinal direction in said other section inside of said case.

11. A portable radio terminal device according to claim 8, further comprising:
    a built-in antenna which is disposed near the back of said case and connected to said radio transmission circuit.

12. A portable radio terminal device according to claim 11, wherein said linear antenna is disposed close to said surface in said case.

13. A portable radio terminal device according to claim 11, wherein said linear antenna is disposed close to the side at an end of said latitudinal direction in said other section inside of said case.

14. A portable radio terminal device according to claim 11, wherein said built-in antenna is of either helical type or inverted F type.

* * * * *